(12) United States Patent
Jacoby et al.

(10) Patent No.: US 9,454,423 B2
(45) Date of Patent: Sep. 27, 2016

(54) SAN PERFORMANCE ANALYSIS TOOL

(71) Applicant: Dell Products, LP, Round Rock, TX (US)

(72) Inventors: Robert B. Jacoby, Merrimack, NH (US); Howard Earnest Arnold, Londonderry, NH (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/224,601

(22) Filed: Mar. 25, 2014

(65) Prior Publication Data
US 2015/0074463 A1    Mar. 12, 2015

Related U.S. Application Data

(63) Continuation-in-part of application No. 14/087,745, filed on Nov. 22, 2013, which is a continuation-in-part of application No. 14/065,825, filed on Oct. 29, 2013, now Pat. No. 9,317,349, which is a continuation-in-part of application No. 14/024,454, filed on Sep. 11, 2013.

(51) Int. Cl.
*G06F 11/00* (2006.01)
*G06F 11/07* (2006.01)

(52) U.S. Cl.
CPC ......... *G06F 11/079* (2013.01); *G06F 11/0727* (2013.01)

(58) Field of Classification Search
USPC .......................................................... 714/26
See application file for complete search history.

(56) References Cited

U.S. PATENT DOCUMENTS

| 5,084,819 A | | 1/1992 | Dewey et al. |
| 5,828,583 A | | 10/1998 | Bush et al. |
| 5,917,724 A | * | 6/1999 | Brousseau ............. G11B 19/04 360/48 |
| 6,148,335 A | * | 11/2000 | Haggard ............. H04L 12/2602 709/224 |

(Continued)

FOREIGN PATENT DOCUMENTS

CN   101414273 B  *  8/2010

OTHER PUBLICATIONS

Pinheiro, E., et al., "Failure Trends in a Large Disk Drive Population," *Proceedings of the 5th USENIX Conference on File and Storage Technologies (FAST'07)*, (Feb. 2007).

(Continued)

*Primary Examiner* — Amine Riad
(74) *Attorney, Agent, or Firm* — Hamilton, Brook, Smith & Reynolds, P.C.

(57) ABSTRACT

The present invention is directed to a method and information handling system (IHS) for improving system performance in a storage area network. An embodiment of the present invention begins by obtaining diagnostic data for the storage area network by asking a user one or more questions and storing results to the one or more questions. Next, test data is obtained by running one or more testing modules on at least one component of the storage area network. A performance analysis of the storage area network is executed, including the obtained diagnostic data and the obtained test data. Then, one or more performance issues and one or more action plans for resolution are identified based upon the analysis. Finally, a report to one or more users is provided including the one or more identified performance issues and the one or more action plans.

20 Claims, 7 Drawing Sheets

(56) References Cited

U.S. PATENT DOCUMENTS

| | | | |
|---|---|---|---|
| 6,189,084 B1 | 2/2001 | Kurisu | |
| 6,408,406 B1 | 6/2002 | Parris | |
| 6,415,189 B1 | 7/2002 | Hajji | |
| 6,434,714 B1* | 8/2002 | Lewis | G06F 11/3612 702/186 |
| 6,467,054 B1 | 10/2002 | Lenny | |
| 6,771,440 B2 | 8/2004 | Smith | |
| 6,845,306 B2 | 1/2005 | Henry et al. | |
| 6,912,676 B1* | 6/2005 | Gusler | G06F 11/2294 714/37 |
| 7,136,768 B1 | 11/2006 | Shah et al. | |
| 7,200,588 B1 | 4/2007 | Srivastava et al. | |
| 7,236,911 B1 | 6/2007 | Gough et al. | |
| 7,278,057 B2 | 10/2007 | Betancourt et al. | |
| 7,302,617 B2 | 11/2007 | Wookey | |
| 7,373,559 B2 | 5/2008 | Guha | |
| 7,409,582 B2 | 8/2008 | McNeill, Jr. et al. | |
| 7,434,097 B2 | 10/2008 | Guha et al. | |
| 7,490,073 B1 | 2/2009 | Qureshi et al. | |
| 7,539,907 B1 | 5/2009 | Johnsen et al. | |
| 7,603,395 B1 | 10/2009 | Bingham et al. | |
| 7,653,563 B2 | 1/2010 | Veeningen et al. | |
| 7,676,445 B2 | 3/2010 | Fry et al. | |
| 7,765,190 B1 | 7/2010 | Bingham et al. | |
| 7,865,278 B2* | 1/2011 | Underdal | G06N 5/003 340/438 |
| 7,877,645 B2 | 1/2011 | Meyer et al. | |
| 7,908,526 B2 | 3/2011 | Guha | |
| 8,005,709 B2* | 8/2011 | King | G06Q 10/06 705/301 |
| 8,015,201 B1 | 9/2011 | Harris | |
| 8,073,821 B2* | 12/2011 | Zahavi | G06F 11/3476 345/440 |
| 8,086,893 B1 | 12/2011 | MacFarland et al. | |
| 8,103,463 B2 | 1/2012 | Kalgren et al. | |
| 8,136,124 B2* | 3/2012 | Kosche | G06F 11/3447 714/47.1 |
| 8,185,784 B2 | 5/2012 | McCombs et al. | |
| 8,315,991 B2 | 11/2012 | Mandagere et al. | |
| 8,316,263 B1 | 11/2012 | Gough et al. | |
| 8,386,889 B1 | 2/2013 | Tang et al. | |
| 8,412,600 B2* | 4/2013 | Kim | G06Q 40/025 705/35 |
| 8,521,546 B2* | 8/2013 | Brown | G06Q 10/067 705/1.1 |
| 8,760,780 B1 | 6/2014 | Brooker | |
| 8,782,491 B2 | 7/2014 | Resch et al. | |
| 8,812,342 B2* | 8/2014 | Barcelo | G06F 21/552 705/7.28 |
| 8,856,927 B1 | 10/2014 | Beloussov et al. | |
| 8,862,948 B1 | 10/2014 | Lam | |
| 8,880,801 B1 | 11/2014 | Robins et al. | |
| 8,904,144 B1 | 12/2014 | Chelur | |
| 8,909,990 B2 | 12/2014 | Davis et al. | |
| 8,949,672 B1 | 2/2015 | Srihamat et al. | |
| 8,949,863 B1 | 2/2015 | Coatney et al. | |
| 8,972,799 B1 | 3/2015 | Brooker et al. | |
| 9,037,921 B1 | 5/2015 | Brooker et al. | |
| 9,084,937 B2* | 7/2015 | Gadher | G06F 11/008 |
| 9,137,110 B1* | 9/2015 | Adogla | H04L 41/082 |
| 9,189,309 B1 | 11/2015 | Ma et al. | |
| 9,317,349 B2 | 4/2016 | Jacoby et al. | |
| 9,396,200 B2 | 7/2016 | Jacoby et al. | |
| 2002/0052718 A1* | 5/2002 | Little | G06F 11/2257 702/188 |
| 2002/0087950 A1 | 7/2002 | Brodeur et al. | |
| 2003/0112538 A1 | 6/2003 | Smith | |
| 2003/0204788 A1 | 10/2003 | Smith | |
| 2004/0205403 A1 | 10/2004 | Markow et al. | |
| 2004/0260967 A1 | 12/2004 | Guha et al. | |
| 2005/0265160 A1 | 12/2005 | Sasaki et al. | |
| 2006/0047715 A1 | 3/2006 | Parizeau | |
| 2006/0053338 A1 | 3/2006 | Cousins et al. | |
| 2006/0075189 A1 | 4/2006 | Hood et al. | |
| 2006/0090098 A1 | 4/2006 | Le et al. | |
| 2006/0112135 A1 | 5/2006 | Warshawsky | |
| 2007/0136389 A1 | 6/2007 | Bergant et al. | |
| 2007/0272751 A1* | 11/2007 | Tsurumi | G11B 27/36 235/437 |
| 2008/0059292 A1* | 3/2008 | Myers | G06Q 10/06 705/7.39 |
| 2008/0209274 A1 | 8/2008 | Nicholson et al. | |
| 2009/0161243 A1* | 6/2009 | Sharma | G11B 27/36 360/31 |
| 2009/0204852 A1 | 8/2009 | Diggs et al. | |
| 2009/0259749 A1* | 10/2009 | Barrett | G06F 11/3495 709/224 |
| 2009/0279673 A1 | 11/2009 | Maffre et al. | |
| 2010/0023867 A1* | 1/2010 | Coldiron | H04L 41/22 715/736 |
| 2010/0030586 A1* | 2/2010 | Taylor | G06Q 40/08 705/4 |
| 2010/0050023 A1 | 2/2010 | Scarpelli et al. | |
| 2010/0324945 A1 | 12/2010 | Hessing | |
| 2011/0106763 A1 | 5/2011 | Madan et al. | |
| 2011/0276836 A1 | 11/2011 | Kahana et al. | |
| 2012/0066030 A1* | 3/2012 | Limpert | G06Q 10/0639 705/7.38 |
| 2012/0102543 A1* | 4/2012 | Kohli | H04L 63/20 726/1 |
| 2012/0136985 A1 | 5/2012 | Popescu et al. | |
| 2012/0179936 A1* | 7/2012 | Masser | G06F 11/0709 714/38.11 |
| 2013/0006701 A1* | 1/2013 | Guven | G06Q 10/0635 705/7.28 |
| 2013/0091499 A1 | 4/2013 | Soundararajan et al. | |
| 2013/0185602 A1 | 7/2013 | Jalaldeen et al. | |
| 2013/0212425 A1 | 8/2013 | Blaine et al. | |
| 2014/0019194 A1 | 1/2014 | Anne | |
| 2014/0040897 A1 | 2/2014 | Davis et al. | |
| 2014/0108855 A1 | 4/2014 | Gopakumar et al. | |
| 2014/0137257 A1* | 5/2014 | Martinez | H04L 63/1433 726/25 |
| 2014/0164290 A1* | 6/2014 | Salter | G06Q 40/06 705/36 R |
| 2014/0214354 A1* | 7/2014 | Dreifus | G01R 31/2856 702/117 |
| 2014/0244343 A1 | 8/2014 | Wilson et al. | |
| 2014/0244362 A1* | 8/2014 | Chaudhury | G06Q 10/06375 705/7.37 |
| 2014/0278730 A1 | 9/2014 | Muhart et al. | |
| 2014/0310714 A1* | 10/2014 | Chan | G06F 17/30598 718/102 |
| 2014/0358357 A1 | 12/2014 | Jones et al. | |
| 2015/0046756 A1 | 2/2015 | Sreekumaran et al. | |
| 2015/0052406 A1 | 2/2015 | Garrett et al. | |
| 2015/0067153 A1 | 3/2015 | Bhattacharyya et al. | |
| 2015/0074055 A1 | 3/2015 | Jacoby et al. | |
| 2015/0074452 A1 | 3/2015 | Tsukahara et al. | |
| 2015/0074462 A1 | 3/2015 | Jacoby | |
| 2015/0074467 A1 | 3/2015 | Jacoby | |
| 2015/0074468 A1 | 3/2015 | Jacoby et al. | |
| 2015/0135033 A1 | 5/2015 | Ellis et al. | |
| 2015/0277804 A1 | 10/2015 | Arnold et al. | |
| 2016/0039291 A1* | 2/2016 | Reese | B60L 3/12 701/29.3 |

OTHER PUBLICATIONS

Anderson, D., et al., "More than an interface—SCSI vs. ATA," *Proceedings of the 2nd Annual Conference on File and Storage Technology (FAST '03)*, pp. 1-13 (Mar. 2003).

Cole, G., "Estimating Drive Reliability in Desktop Computers and Consumer Electronics Systems," *Seagate Technology Paper TP-338.1*, pp. 1-8, (Nov. 2000).

(56) References Cited

OTHER PUBLICATIONS

Yang, J., et al., "A Comprehensive Review of Hard-Disk Drive Reliability," *Proceedings of the Annual Symposium on Reliability and Maintainability*, pp. 403-409 (Jan. 1999).

Hughes, G.F., et al., "Improved Disk-Drive Failure Warnings," *IEEE Transactions on Reliability*, 51(3): 350-357 (Sep. 2002).

Murray, J.F., et al., "Machine Learning Methods for Predicting Failures in Hard Drives: A Multiple-Instance Application," *J. Machine Learning Research*, 6: 783-816 (May 2005).

Wilcoxon, F., "Individual Comparison by Ranking Methods," *Biometrics Bulletin*, 1(6): 80-83 (1945); http://www.jstor.org, pp. 80-83 (Dec. 18, 2006).

\* cited by examiner

SAN PERFORMANCE ANALYSIS TOOL

RELATED APPLICATIONS

This application is a continuation-in-part of U.S. application Ser. No. 14/087,745 filed on Nov. 22, 2013, which is a continuation-in-part of U.S. application Ser. No. 14/065,825 filed on Oct. 29, 2013, which is a continuation-in part of U.S. application Ser. No. 14/024,454 filed on Sep. 11, 2013. The entire teachings of the above applications are incorporated herein by reference.

BACKGROUND OF THE INVENTION

The increased use of technology and computers has generated a corresponding increase in digital data. This ever-increasing digital data requires a corresponding ever-increasing amount of storage space.

The need for storage space for digital data is fueled through many changes in society. For example, home computer users increased storage of multimedia data, especially video and photographic data, has served to increase the amount of storage space needed. Likewise, industry also requires increased storage space. As more and more business is being conducted electronically, there is an ever-increasing demand and need for the storage of this vast amount of business data. Furthermore, there is a demand to digitize the storage of once paper files in an attempt to decrease the overhead cost of this paper generation and storage.

With this increase of digital data, there is a corresponding further reliance upon the integrity and required accessibility of the digital data. While storage device reliability has increased, these devices have not become infallible.

SUMMARY OF THE INVENTION

Thus, an efficient and reliable method for improving system performance in a storage area network is presented. The present invention is directed to a method and corresponding apparatus for improving system performance in a storage area network. An embodiment of the method of the present invention begins by obtaining diagnostic data for a storage area network by asking a user one or more questions and storing results to the one or more questions. Next, test data is obtained by running one or more testing modules on at least one component of the storage area network. Next, a performance analysis is executed of the storage area network, including the obtained diagnostic data and the obtained test data. Further, the method identifies one or more performance issues and one or more action plans for resolution based upon the analysis. Finally, the method provides a report to one or more users including the one or more identified performance issues and the one or more action plans.

In an embodiment of the method of the present invention, the at least one component includes at least one of: a server, network interface card (NIC), network adapter, network controller, switch, array, storage group, interconnect, volume, computer-implemented network stack, and computer-implemented application. In another embodiment of the method of the present invention, at least one of the obtained diagnostic data and the obtained test data comprises at least one of: configuration information; and environmental information. In another embodiment of the method of the present invention, at least one of the obtained diagnostic data and the obtained test data includes diagnostic logfile data based upon at least one of one or more hardware characteristics and one or more software characteristics of the storage area network.

In another embodiment of the method of the present invention, at least one of the obtained diagnostic data and the obtained test data includes at least one of: performance characteristic, bug footprint, hardware issue, environmental problem, software issue, network problem, and configuration problem. In another embodiment of the method of the present invention, the one or more performance issues include one or more potential performance issues.

In another embodiment of the method of the present invention, the obtained diagnostic data may include at least one of: a performance characteristic, hardware characteristic, software characteristic, environmental characteristic, configuration characteristic, and network characteristic. The obtained test data may include at least one of: a performance characteristic, hardware characteristic, software characteristic, environmental characteristic, configuration characteristic, and network characteristic. The one or more identified performance issues may include an issue with at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration (where a storage device may include, but is not limited to, a storage array, storage volume, storage group, series array, and/or series group). The one or more action plans may include an action plan to correct or update at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration.

In another embodiment of the method of the present invention, the analysis may include a performance analysis. The obtained diagnostic data may include at least one of a hardware, software, and network characteristic that includes at least one of: flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput. The obtained test data may include at least one of a hardware, software, and network characteristic that includes at least one of: flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput. The one or more identified performance issues may include an issue with at least one of: a hardware component, hardware module, hardware interconnect, environmental condition, firmware, firmware version, memory, disk space, network connectivity, network configuration, load balancing, performance characteristics, host side, and storage device configuration. The one or more action plans may include an action plan to update or correct at least one of: a hardware component, hardware module, hardware interconnect, environmental condition, firmware, firmware version, memory, disk space, network connectivity, network configuration, load balancing, performance characteristics, host side, and storage device configuration.

In another embodiment of the method of the present invention, the method may associate a high, medium, or low risk score indicator with the storage area network based upon the performance analysis. The method may associate a high-plus, high, high-minus, medium-plus, medium, medium-minus, low-plus, low, or low-minus risk score indicator with the storage area network based upon the performance analysis.

A further embodiment of the present invention is directed to an Information Handling System (IHS). An embodiment of the IHS comprises a data module configured to obtain diagnostic data for a storage area network by asking a user one or more questions and storing results to the one or more questions. The data module may obtain test data by running one or more testing modules on at least one component of the storage area network. The IHS may further comprise a computing module communicatively coupled to the data module and configured to execute a performance analysis of the storage area network, including the obtained diagnostic data and the obtained test data. The computing module may identify one or more performance issues and one or more action plans for resolution based upon the analysis. The IHS may further comprise a display module configured to provide a report to one or more users including the one or more identified performance issues and the one or more action plans.

According to an embodiment of the IHS, the at least one component may include at least one of: a server, network interface card (NIC), network adapter, network controller, switch, array, storage group, interconnect, volume, computer-implemented network stack, and computer-implemented application. According to an embodiment of the IHS, at least one of the obtained diagnostic data and the obtained test data comprises at least one of: configuration information and environmental information.

According to an embodiment of the IHS, at least one of the obtained diagnostic data and the obtained test data includes diagnostic logfile data based upon at least one of one or more hardware characteristics and one or more software characteristics of the storage area network. According to another embodiment of the IHS, at least one of the obtained diagnostic data and the obtained test data includes at least one of: a performance characteristic, bug footprint, hardware issue, environmental problem, software issue, network problem, and configuration problem. According to another embodiment of the IHS, the one or more performance issues include one or more potential performance issues.

According to another embodiment of the IHS, the obtained diagnostic data includes at least one of: a performance characteristic, hardware characteristic, software characteristic, environmental characteristic, configuration characteristic, and network characteristic. The obtained test data includes at least one of: a performance characteristic, hardware characteristic, software characteristic, environmental characteristic, configuration characteristic, and network characteristic. The one or more identified performance issues include an issue with at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration.

The one or more action plans include an action plan to correct or update at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration.

According to another embodiment of the IHS, the analysis may include a performance analysis. The obtained diagnostic data may include at least one of: a hardware, software, and network characteristic that includes at least one of: a flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput. The obtained test data may include at least one of: a hardware, software, and network characteristic that includes at least one of: a flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput. The one or more identified performance issues may include an issue with at least one of: a hardware component, hardware module, hardware interconnect, environmental condition, firmware, firmware version, memory, disk space, network connectivity, network configuration, load balancing, performance characteristics, host side, and storage device configuration. The one or more action plans may include an action plan to update or correct at least one of: a hardware component, hardware module, hardware interconnect, environmental condition, firmware, firmware version, memory, disk space, network connectivity, network configuration, load balancing, performance characteristics, host side, and storage device configuration. An embodiment of the IHS may further comprise associating a high, medium, or low risk score indicator with the storage area network based upon the performance analysis.

An alternative embodiment of the present invention is directed to a non-transitory computer readable medium having stored thereon a sequence of instructions which, when loaded and executed by a processor coupled to an apparatus, causes the apparatus to: obtain diagnostic data for a storage area network by asking a user one or more questions and storing results to the one or more questions, obtain test data by running one or more testing modules on at least one component of the storage area network, execute a performance analysis of the storage area network, including the obtained diagnostic data and the obtained test data, identify one or more performance issues and one or more action plans for resolution based upon the analysis and provide a report to one or more users including the one or more identified performance issues and the one or more action plans.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Although various benchmarking tools exist to stress particular components, no integrated tool exists that chooses the right tool based on a problem statement and analyzes the performance results. Performance issues are often complex and time-consuming. There is a need for a process and a tool that isolates and resolves performance issues and improves customer satisfaction while reducing costs in the technical support process.

Therefore, the proposed approach includes a performance analysis tool. The proposed approach guides the support technician through a troubleshooting methodology to isolate problem areas. The proposed approach includes pre-built testing modules that optionally are run in a customer's environment. The proposed approach includes an analytical component that combines the results from tests with diagnostic information from the storage devices in order to provide the user (the support technician user, engineer user, customer user, and/or other type of user) with an action plan toward resolution.

Figure 1:
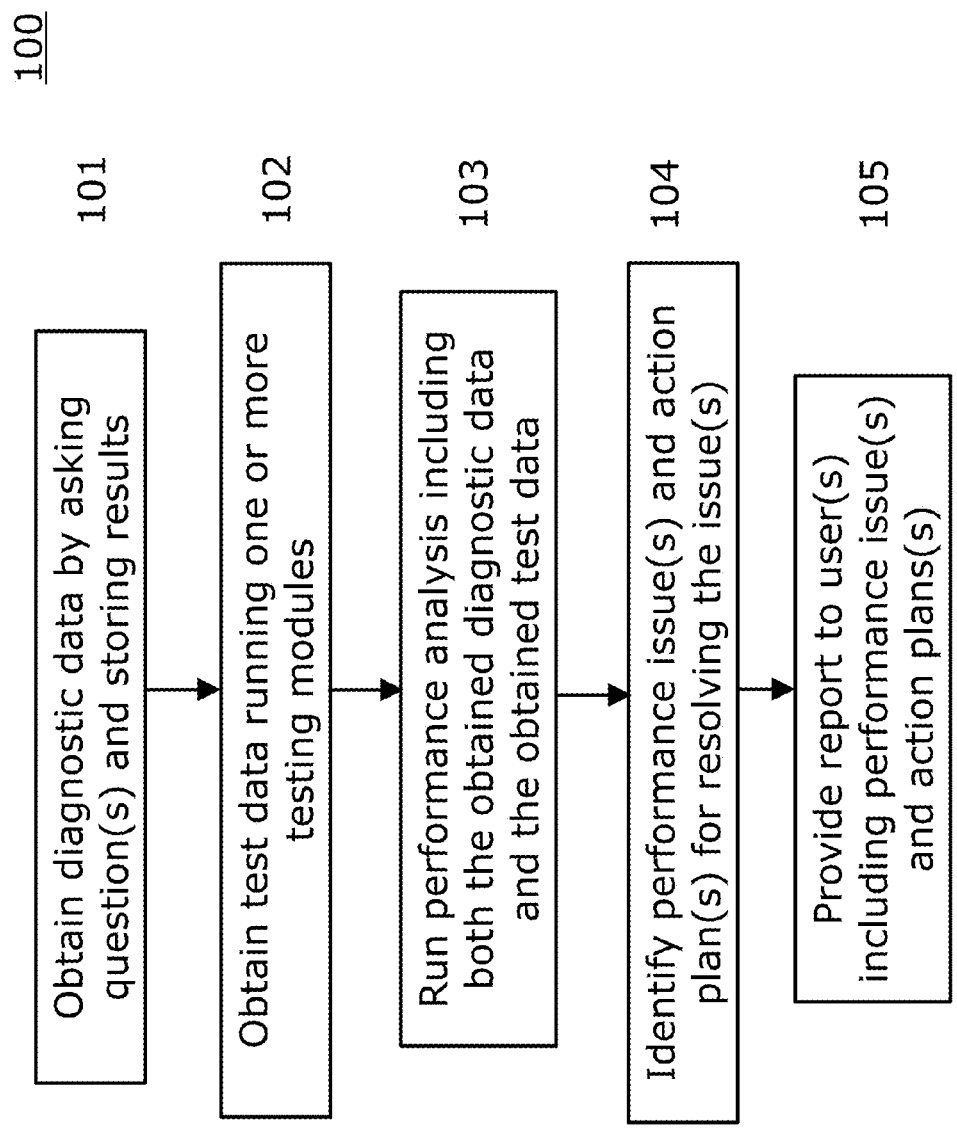
FIG. 1 is a flowchart of a method of improving system performance in a storage area network, according to an embodiment of the invention.

Thus, as illustrated in FIG. 1, an efficient and reliable method 100 for improving system performance in a storage area network is presented. The present invention is directed to a method and corresponding apparatus for improving system performance in a storage area network. An embodiment of the method of the present invention begins by obtaining diagnostic data for a storage area network by asking a user one or more questions and storing results to the one or more questions 101. Next, test data is obtained by running one or more testing modules on at least one component of the storage area network 102. Next, a performance analysis is executed of the storage area network, including the obtained diagnostic data and the obtained test data 103. Further, the method identifies one or more performance issues and one or more action plans for resolution based upon the analysis 104. Finally, the method provides a report to one or more users including the one or more identified performance issues and the one or more action plans 105.

Figure 2:
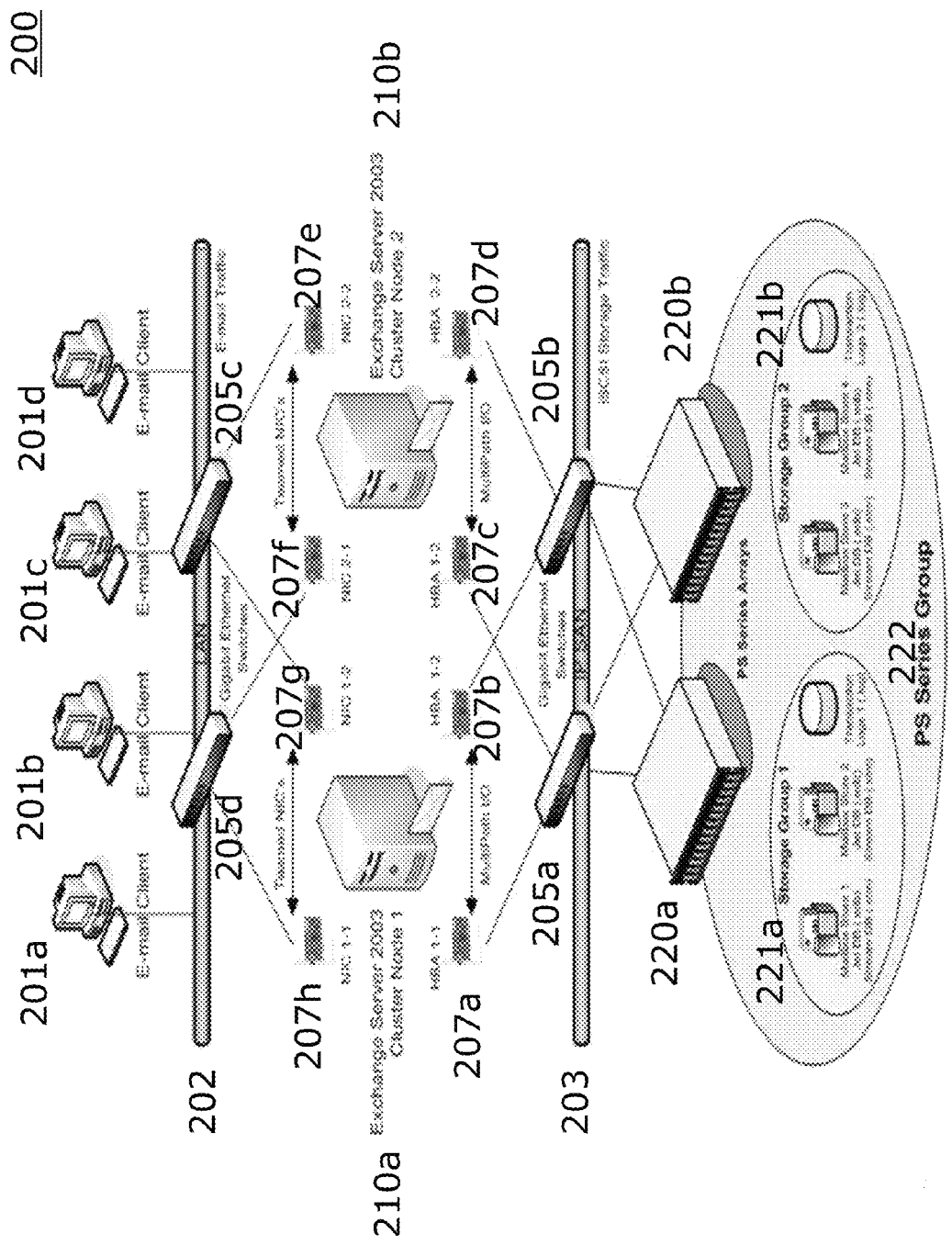
FIG. 2 is a schematic view of a computer network environment in which an embodiment of the present invention may be implemented.

As illustrated in FIG. 2, in one embodiment, the proposed approach may run on a network 200 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an internet protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited, to, storage groups 221a, 221b and PS series data arrays 220a, 220b. In an alternative embodiment, the SAN 203 may be considered to include the LAN 202 and the above-mentioned components with which the LAN 202 communicates, in addition to the above-mentioned components with which the SAN 203 communicates.

Figure 3:
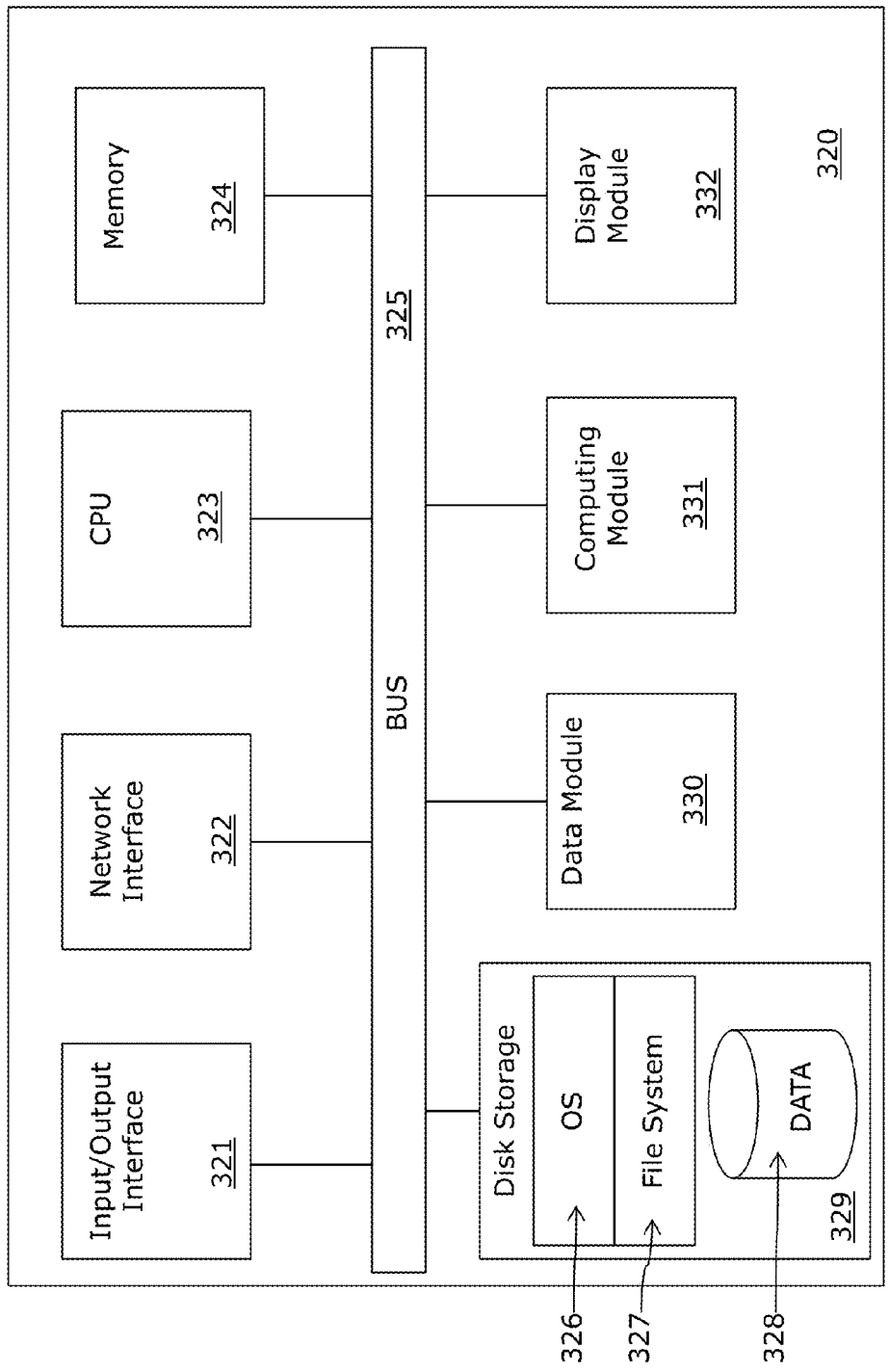
FIG. 3 is a simplified block diagram of an Information Handling System (IHS) in an embodiment of the present invention.

FIG. 3 is a high level block diagram of an information handling system (IHS) 320 that is configured to improve system performance in a storage area network according to the present invention. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

The IHS 320 further comprises a data module 330. According to an embodiment of the IHS 320, the data module 330 is configured to obtain diagnostic data for a storage area network by asking a user one or more questions and storing results to the one or more questions. The data module 330 is further configured to obtain test data by running one or more testing modules on at least one component of the storage area network. The obtained diagnostic data and/or the obtained test data of the data module 330 may be any data as described herein. The data module 330 may retrieve the diagnostic data and/or the obtained test data from any communicatively coupled source. For example, the data module 330 may retrieve the diagnostic data and/or the obtained test data from the storage device 329 or via the input/output interface 321 or network interface 322.

Communicatively coupled to the data module 330 is the computing module 331. The computing module 331 is configured to execute a performance analysis of the storage area network based on the obtained diagnostic data from the data module 330, the obtained test data, and rules/algorithms of the present invention. The rules/algorithms may be obtained from any communicatively coupled source, including, but not limited to, the computing module 331, the network 322, from the input/output interface 321, the memory 324, or from disk storage 329. The computing module 331 is further configured to identify one or more performance issues and one or more corresponding action plans for resolution based upon the performance analysis. The IHS 320 further comprises a display module 332. The display module 332 is configured to provide a report to one or more users including any identified performance issues or action plans.

The IHS 320 and its various components and modules work in conjunction to improve system performance in a storage area network. According to an example operation of the IHS 320, the data module 330 obtains diagnostic data and retrieves test data for at least one component of the storage area network, such as a component of the storage area network communicatively coupled to the IHS 320 via the network interface 322. Next, the computing module 331 performs an analysis and identifies performance issues and action plans for resolution. Finally, the display module 332 reports the identified performance issues and action plans to one or more users.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or OS 326 operated on by CPU 323. Further, the IHS 320 and its various components and modules may be configured to operate in a manner corresponding to the above described method 100, described herein above in relation to FIG. 1 and its various embodiments.

Figure 4:
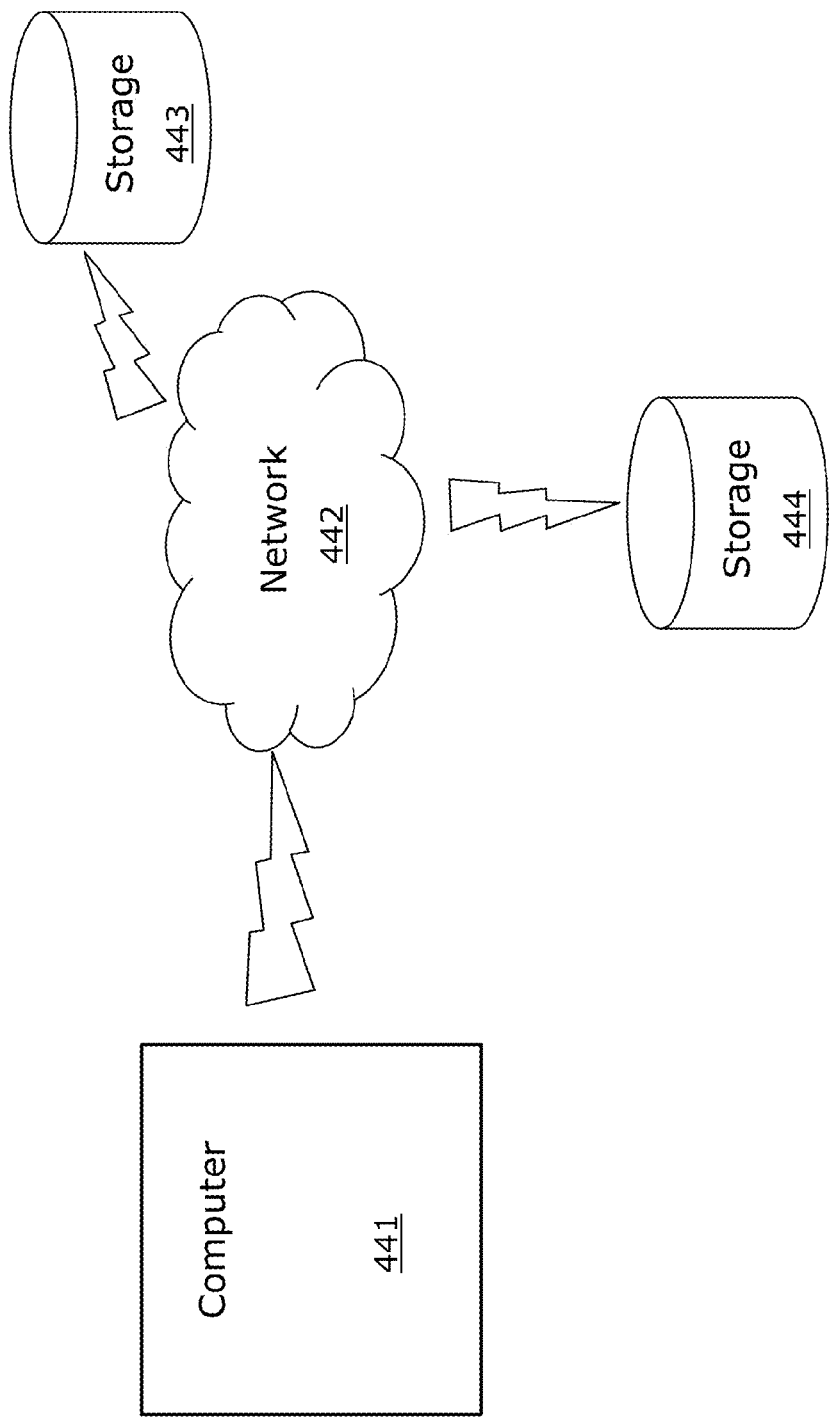
FIG. 4 is a block diagram view of another computer network environment in which an embodiment of the present invention may be implemented.

FIG. 4 illustrates another computer network environment 440 in which the present invention may be implemented. The computer 441 and the storage devices 443 and 444 are linked through network 442. The computer 441 and the storage devices 443 and 444 may be connected through any network as is known in the art, including a storage area network (SAN), a wide area network (WAN) or local area network (LAN). The computer 441 may embody the IHS 320 and/or any embodiment of the IHS described herein. Similarly, the computer 441 may be configured to carry out any method or embodiment thereof described herein. According to an embodiment of the invention, the computer 441 is configured to improve system performance the network 442 and the storage devices 443 and 444. While only two storage devices 443 and 444 are depicted, the computer network environment 440 may comprise any number of storage devices.

Referring back to FIG. 1, an embodiment of the method of the present invention begins by obtaining diagnostic data for a storage area network by asking a user one or more questions and storing results to the one or more questions 101. Based on the problem description, the method 100 may gather data, and/or obtain data from one or more users to questions, inquiries, and/or recommendations, for at least one of the following: Is the problem ongoing or recently started? Did any recent changes or additions occur just prior to the problem starting? Is this a problem reported by users or are you seeing a metric or monitoring program reporting the problem? If it is a metric or monitoring program, please provide details regarding what the expected value is for good performance. Does the problem occur on one volume—if so which volume is it? Does the problem happen with one application—if so, which application and/or which version? Does the problem happen at a particular time—if so, what time(s) of day or days of the week? Does the problem happen on one server—if so, which server and what Internet Protocol (IP) addresses does it have? What Operating System (OS) is this server running? Please provide anything else the customer thinks is relevant.

In one embodiment, the types of questions may include, but are not limited to, the following questions, inquiries, and/or recommendations:

1. Servers
a. Make and/or model of servers and SAN network NICs. Are the NICs standard NICs or Host Bus Adapters (HBAs)?
b. Operating system including version?
c. Is the server multi-homed (separate LAN and SAN NICs and/or networks)?
d. Is the Host integration Toolkit installed on the server and what version is it?
e. Are the servers clustered?

2. Applications
a. Application name and version?
b. Is the application clustered?
c. Is the application running on a physical server or a virtual server?
d. What array volumes are used by the application?
e. What metrics does the application require? For non-limiting example, a set of metrics may include 1000 input/output per second (IOPS) at 8K (8192) transactions (for example, writes and/or reads) with less than 20 ms latency. If the application's requirements are determined, confirm or deny whether the storage device meets the metric requirements through a testing module, including but not limited to IOMETER.

3. Server SAN NICs
a. How many NICs exist per server for the SAN network and are they standard NICs or HBAs?
b. Make and/or model of the NICs/HBAs?
c. For standard NICs what version of the driver are they running? What are the settings for the following items on each NIC?
i. Flow control
ii. Frame size
iii. TCP Large Send Offload
iv. Receive Side Scaling d. For HBAs get the following items on each HBA:
i. Basic input/output System (BIOS) and/or Firmware and/or Driver versions
4. Network
a. SAN Network Switches—make and/or model and/or version number
b. Interconnect between switches—trunked or stacked? If trunked, how many ports in the trunk group?
c. Network diagram if available
d. Obtain Configuration Information for one or more switches through at least one of the following network switch commands (well known in the art) on the one or more switches:
i. "show running"
ii. "show vlan"
iii. "show flowcontrol"
iv. "show storm-control"
5. Arrays
Collect a complete set of diagnostics from members and/or SAN HEADQUARTERS (SANHQ) archives if SANHQ is run. Most of the following information is retrieved from diagnostics.
a. How many storage groups?
b. How many pools within each storage group?
c. How many members in each pool?
d. For each member:
i. Name
ii. RAID Policy
iii. Performance metrics (spreadsheet)
iv. Firmware version
v. Retransmit issues?
vi. Timeouts? How long are timeouts? Are the timeouts N seconds (where N may be 1, 6, 10, or other values)?
vii. Check status in reports to ensure that processes are started and not restarting more than expected.
viii. Have customer do a ping test to prove that array ports and server NICs are seen by other array ports.

In one embodiment, the obtained diagnostic data obtained in step 101 may include a performance characteristic, hardware characteristic, software characteristic, environmental characteristic, configuration characteristic, and/or network characteristic. In another embodiment, the obtained diagnostic data may include a hardware, software, and/or network characteristic that includes flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and/or network throughput.

Next, test data is obtained by running one or more testing modules on at least one component of the storage area network 102. The one or more testing modules may run performance tests including, but not limited to, tests using IOMETER, IOSTAT, SQLIO, EXCHANGE PERF, and/or WIRESHARK. The testing modules may run one or more tests that include one or more test descriptions and provide test results.

In one embodiment, the obtained test data includes the same type of data as the obtained diagnostic data. In another embodiment, the obtained test data includes different types of data as the obtained diagnostic data. In yet another embodiment, the obtained test data includes some data of the same type as the obtained diagnostic data, and some data of a different type than the obtained diagnostic data.

In one embodiment, the obtained test data may include a performance characteristic, hardware characteristic, software characteristic, environmental characteristic, configuration characteristic, and/or network characteristic. In another embodiment, the obtained test data may include a hardware, software, and/or network characteristic that includes flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and/or network throughput.

Next, a performance analysis is executed of the storage area network, based upon the gathered data, including the obtained diagnostic data and the obtained test data 103. The gathered data is analyzed, and issues are identified. A performance issue may include one or more causes and fixing one cause might uncover other issues masked by the original issue. The method identifies one or more performance issues and one or more action plans for resolution based upon the analysis 104.

For non-limiting example, the performance analysis 103 may include network analysis, including analyzing retransmits, timeouts, configuration issues including but not limited to spanning tree issues, flow control issues, and/or switch utilization issues.

Figure 5:
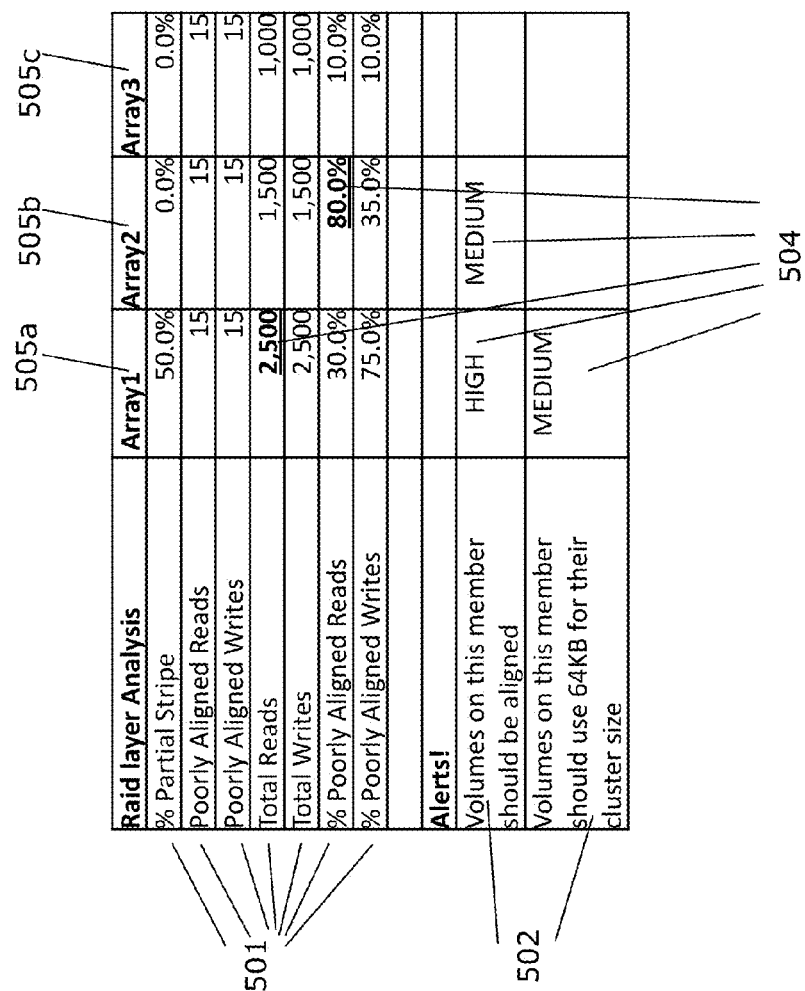
FIG. 5 is a schematic view of one embodiment of a portion of a display in one embodiment of the present invention.

For non-limiting example, referring to the display 500 of FIG. 5, the method of the present invention may obtain diagnostic data and/or test data 501, for one or more storage devices 505a, 505b, 505c. One or more users may input the diagnostic and/or test data 501. Alternatively, the diagnostic and/or test data may be received based on results of one or more tests run in step 102 of FIG. 1. The method 100 may also detect and provide indications 504 of one or more performance issues 502. The indications 504 of the one or more performance issues may include, but are not limited to, a different color, individual character or set of characters, text, highlighted text, underlined text, bolded text, graphics and/or a visual and/or audio presentation and/or other representation.

In the display 500 example of FIG. 5, one or more action plans for resolution 502 are provided, which may be the same as the one or more performance issues. However, the present invention is not so limited, and the one or more action plans for resolution and the one or more identified performance issues may be different and/or separate items in the display.

The performance analysis of FIG. 5 may use one or more equations to determine an indicator of risk score. Note, the risk score may be indicated 504 by a color, individual character or set of characters, text, graphics and/or a visual and/or audio presentation and/or other representation. In addition, the risk score may include high-plus, high, high-minus, medium-plus, medium, medium-minus, low-plus, low, or low-minus risk score indicator with the storage area network based upon the performance analysis. In addition, as illustrated in FIG. 5, the method provides a report 500 to one or more users including the one or more identified performance issues and the one or more action plans 105.

The performance analysis 103 of FIG. 1 may include a set of rules/algorithms for analyzing performance. The performance analysis may use one or more equations to determine an indicator of risk score. For a non-limiting example, an example embodiment applies to the obtained test data and/or diagnostic data 501 the following mathematical relationships (or equations), where R is a risk score and K1 and K2 are constants:

RAID Layer Analysis:

---

If 'Number of Poorly Aligned Reads' / ∈ Range 1 : Set $R_1$ low
$\qquad\qquad\qquad\qquad\qquad$ ∈ Range 2 : Set $R_1$ med
$\qquad\qquad\qquad\qquad\qquad$ ∈ Range 3 : Set $R_1$ high
Then Risk Score $_{AR}$ := $R_1$
If 'Number of Poorly Aligned Writes' / ∈ Range 4 : Set $R_2$ low
$\qquad\qquad\qquad\qquad\qquad$ ∈ Range 5 : Set $R_2$ med
$\qquad\qquad\qquad\qquad\qquad$ ∈ Range 6 : Set $R_2$ high
Then Risk Score $_{AW}$ := $R_2$
Total Risk Score = $K1*R_1 + K2*R_2$

---

In step 104, the method may identify one or more performance issues and one or more action plans for resolution. Action plans for resolution may include procedures, suggestions, and/or recommendations to the customer, including, but not limited to the following: If the problem previously existed, carefully review the design and confirm that the proper equipment is purchased in order to meet the performance needs (e.g., IOPS, throughput, latency). If the issue is recent, determine what changes are recently implemented to ascertain whether any correlation exists. Confirm whether the customer is using a valid, industry standard test and that the customer is actually seeing a problem. Determine the IO characteristics for the volume. Small transactional IOs (for non-limiting example, less than 16K or 16384 in number) are more likely to be disk bound, while larger IOs are more likely to be network/throughput bound.

Figure 6:
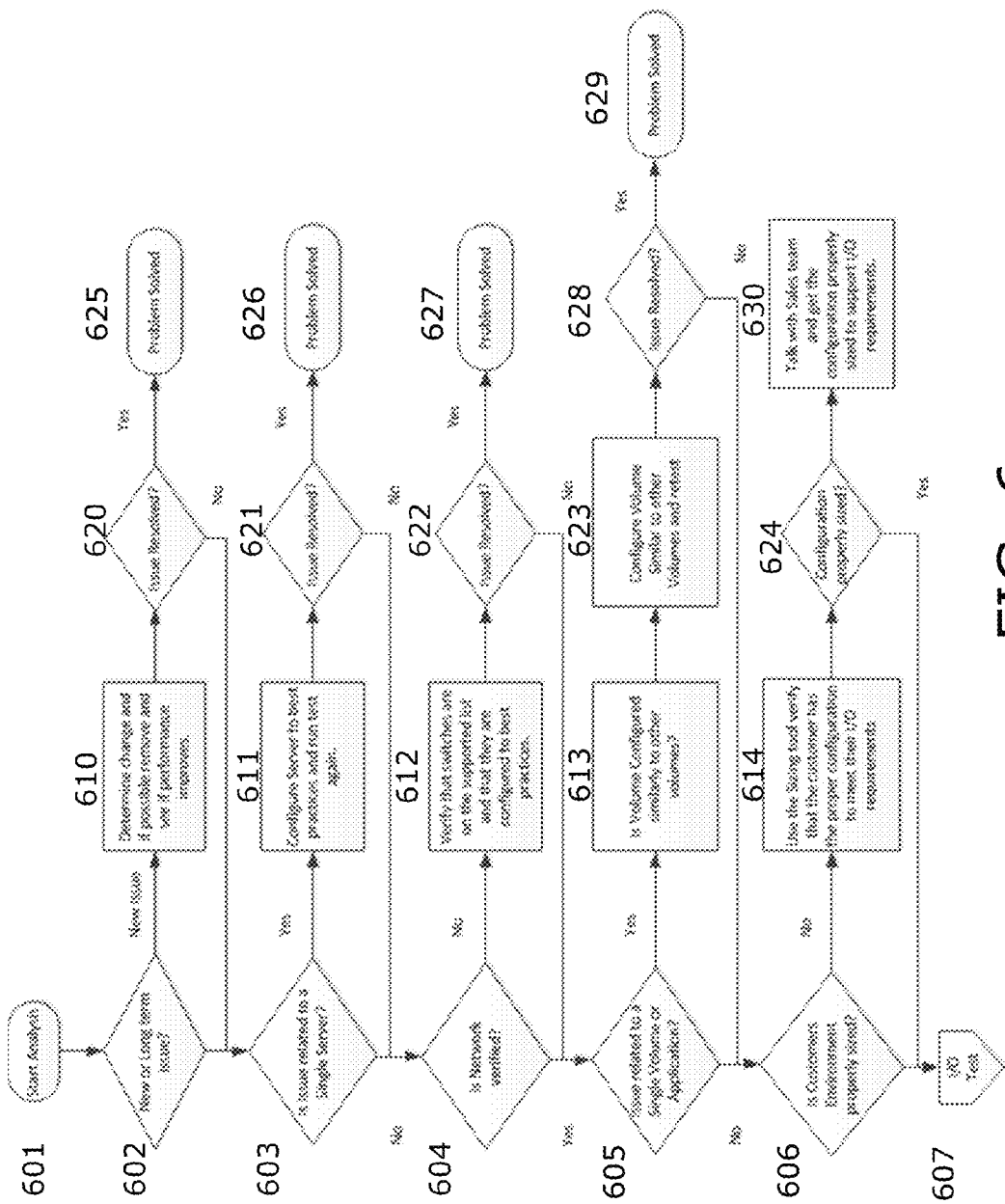
FIG. 6 is a flowchart of an embodiment of the performance analysis of the present invention.

Referring back to the performance analysis step 103 of method 100, the performance analysis 103 may also include one or more checks based upon the obtained test data and/or obtained diagnostic data, as illustrated in the non-limiting example of FIG. 6. In addition, performance analysis may include additional questions being asked to the user. After starting the performance analysis 601, the method may include a check for a new or long term issue 602. If the issue is new, then a check is performed 610 to determine a possible change, and make a modification to remove the issue and see if performance improves. If performance improves, then a check is performed to determine whether the issue is resolved 620. If the issue is resolved, the performance analysis exits 625. However, if the issue is not resolved based upon the check 620, or if the issue is a long term issue, then a check is performed to determine whether the issue is related to a single server 603.

If the issue is related to a single server, then the server is configured to best practices in 611. Best practices may include one or more action plans as described herein, or one or more actions to resolve the one or more identified issues described herein, a set of rules and/or recommendations, or another type of best practices. Then, one or more tests are re-run to obtain new test data in 611. Next, a check is performed to determine whether the issue is resolved 621. If the issue is resolved in 621, then the performance analysis exits 626. If the issue is not resolved in 621, or if the issue does not relate to a single server in 603, then a check is performed to determine if the network is verified 604. If the network is not verified, then a check is performed to ensure that the switches are on the supported list and are configured to best practices 612. If the issue is resolved in 622, then the performance analysis exits 627. If the issue is not resolved, or if the network is verified, then a check is performed as to whether the issue relates to a single volume or application 605.

Figure 7:
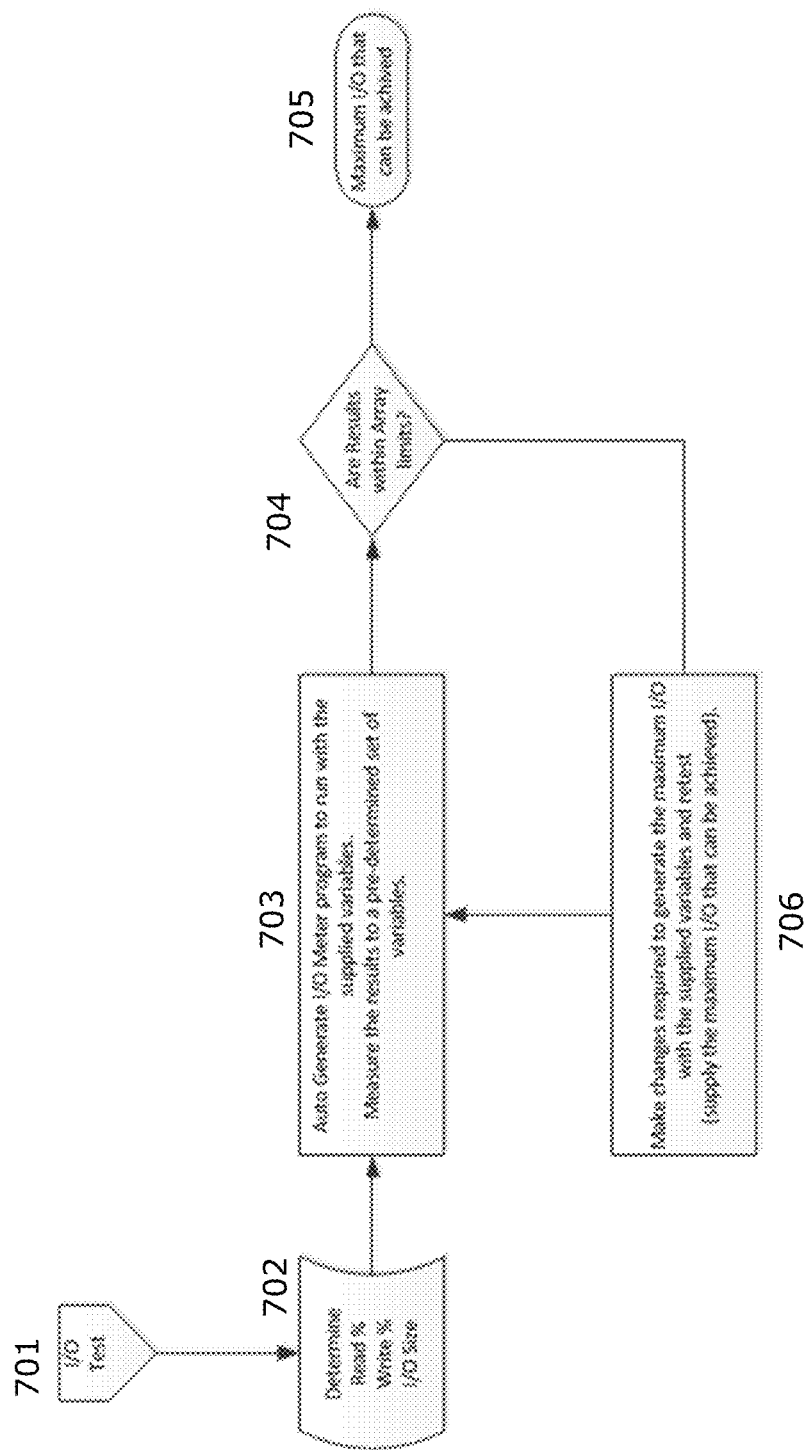
FIG. 7 is a flowchart of an embodiment of an IO test of FIG. 6 of the present invention.

If the issue relates to a single volume or application, then a check is performed 613 to determine whether the volume is configured similarly to other volumes. If it is not configured similarly to other volumes, then the volume is configured similarly to other volumes and retested 623. Then, if the issue is resolved in 628 then the performance analysis exits 629. However, if the issue is not resolved or the issue relates to more than a single volume or application, then a check is performed to determine whether the customer's environment is properly sized 606. If the customer's environment is not properly sized, then the sizing tool is used to verify that the customer has the proper configuration to meet its input/output (I/O and/or IO) requirements 614. If the configuration is not properly sized in 624, the one or more users interacts with the sales team and gets the configuration properly sized to support IO requirements 630. If the configuration is properly sized, then an IO test is performed 607. FIG. 7 illustrates one such IO test.

FIG. 7 illustrates an optional step where an automated test is generated through one or more testing modules in order to run against the array to gather performance data. As illustrated in FIG. 7, the IO test starts 701 by determining a set of variables 702, including, but not limited to, a percentage of reads, percentage of writes, and input-output (IO) size. Then the IO test auto-generates an IOMETER program to run with the supplied variables and measures the results to a pre-determined set of variables 703. A check is performed to determine whether the results are within storage device limits 704. Based upon the check in 704, the user (and/or support technician) may make changes to generate the maximum IO with the supplied variables, and retest (the intention is to supply the maximum number of IO that may be achieved) 706, and then step 703 is repeated in order to regenerate the IOMETER program. Alternatively, based upon the check in 704, the user (and/or support technician) may complete the IO test, i.e. at 705 with the maximum number of IO that can be achieved.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for improving system performance in a storage area network, the method comprising:
    obtaining diagnostic data for the storage area network by asking one or more users one or more questions and storing user responses to the one or more questions;
    obtaining test data by running one or more testing modules on at least one component of the storage area network;
    executing a performance analysis of the storage area network, including the obtained diagnostic data and the obtained test data;
    identifying one or more performance issues and one or more action plans for resolution based upon results of the performance analysis;
    providing a report to the one or more users, the report including the one or more identified performance issues and the one or more action plans; and
    automatically associating a high, medium, or low risk score indicator with the storage area network based upon the results of the performance analysis.

2. The computer-implemented method of claim 1 wherein the at least one component includes at least one of: a server, network interface card (NIC), network adapter, network controller, switch, array, storage group, interconnect, volume, computer-implemented network stack, and computer-implemented application.

3. The computer-implemented method of claim 1 wherein at least one of the obtained diagnostic data and the obtained test data comprises at least one of:
    configuration information; and
    environmental information.

4. The computer-implemented method of claim 1 wherein at least one of the obtained diagnostic data and the obtained test data includes diagnostic logfile data based upon zero or more hardware characteristics and one or more software characteristics of the storage area network.

5. The computer-implemented method of claim 1 wherein at least one of the obtained diagnostic data and the obtained test data includes at least one of: performance characteristic, bug footprint, hardware issue, environmental problem, software issue, network problem, and configuration problem.

6. The computer-implemented method of claim 1 wherein the one or more performance issues include one or more potential performance issues.

7. The computer-implemented method of claim 1 wherein:
    the obtained diagnostic data includes at least one of: a performance characteristic, hardware characteristic, software characteristic, environmental characteristic, configuration characteristic, and network characteristic;
    the obtained test data includes at least one of: a performance characteristic, hardware characteristic, software characteristic, environmental characteristic, configuration characteristic, and network characteristic;
    the one or more identified performance issues include an issue with at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration; and
    the one or more action plans include an action plan to correct or update at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration.

8. The computer-implemented method of claim 1 wherein:
    the obtained diagnostic data includes a network characteristic that includes network throughput and zero or more of a hardware, software, and another network characteristic that includes at least one of: flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput;
    the obtained test data includes at least one of a hardware, software, and network characteristic that includes at least one of: flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput;
    the one or more identified performance issues include an issue with at least one of: a hardware component, hardware module, hardware interconnect, environmental condition, firmware, firmware version, memory, disk space, network connectivity, network configuration, load balancing, performance characteristics, host side, and storage device configuration; and the one or more action plans include an action plan to update or correct at least one of: a hardware component, hardware module, hardware interconnect, environmental condition, firmware, firmware version, memory, disk space, network connectivity, network configuration, load balancing, performance characteristics, host side, and storage device configuration.

9. The computer-implemented method of claim 1 further comprising:

further associating a high-plus, high-minus, medium-plus, medium-minus, low-plus, or low-minus risk score indicator with the storage area network based upon the results of the performance analysis.

10. An information handling system (IHS) comprising:

a processor; and a memory with non-transitory computer code instructions stored therein, the memory operatively coupled to said processor such that the computer code instructions configure the processor to implement:

a data module configured to obtain diagnostic data for a storage area network by asking one or more users one or more questions and storing user responses to the one or more questions;

the data module further configured to obtain test data by running one or more testing modules on at least one component of the storage area network;

a computing module communicatively coupled to the data module and configured to execute a performance analysis of the storage area network, including the obtained diagnostic data and the obtained test data;

the computing module further configured to identify one or more performance issues and one or more action plans for resolution based upon results of the performance analysis;

a display module configured to provide a report to the one or more users, the report including the one or more identified performance issues and the one or more action plans; and the computing module further configured to automatically associate a high, medium, or low risk score indicator with the storage area network based upon the results of the performance analysis.

11. The IHS of claim 10 wherein the at least one component includes at least one of: a server, network interface card (NIC), network adapter, network controller, switch, array, storage group, interconnect, volume, computer-implemented network stack, and computer-implemented application.

12. The IHS of claim 10 wherein at least one of the obtained diagnostic data and the obtained test data comprises at least one of:

configuration information; and environmental information.

13. The IHS of claim 10 wherein at least one of the obtained diagnostic data and the obtained test data includes diagnostic logfile data based upon zero or more hardware characteristics and one or more software characteristics of the storage area network.

14. The IHS of claim 10 wherein at least one of the obtained diagnostic data and the obtained test data includes at least one of: a performance characteristic, bug footprint, hardware issue, environmental problem, software issue, network problem, and configuration problem.

15. The IHS of claim 10 wherein the one or more performance issues include one or more potential performance issues.

16. The IHS of claim 10 wherein:

the obtained diagnostic data includes at least one of: a performance characteristic, hardware characteristic, software characteristic, environmental characteristic, configuration characteristic, and network characteristic;

the obtained test data includes at least one of: a performance characteristic, hardware characteristic, software characteristic, environmental characteristic, configuration characteristic, and network characteristic;

the one or more identified performance issues include an issue with at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration; and the one or more action plans include an action plan to correct or update at least one of: a hardware component, hardware module, hardware configuration, hardware interconnect, environmental condition, configuration condition, firmware, firmware version, software configuration, memory, disk space, network connectivity, network configuration, load balancing, performance characteristics, host side, and storage device configuration.

17. The IHS of claim 10 wherein:

the obtained diagnostic data includes a network characteristic that includes network throughput and zero or more of a hardware, software, and another network characteristic that includes at least one of: a flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput;

the obtained test data includes at least one of: a hardware, software, and network characteristic that includes at least one of: a flow control information, write speed, read speed, number of reads, number of requests, number of writes, number of full stripe writes, number of partial stripe writes, percentage of full stripe writes, percentage of partial stripe writes, number of poorly aligned reads, number of poorly aligned writes, percentage of poorly aligned reads, percentage of poorly aligned writes, latency, input size, output size, number of faults, number of retransmits, number of transfers, number of packet errors, transaction frequency, cache utilization, input/output (IO) wait state data, length of waits, number of waits, and network throughput;

the one or more identified performance issues include an issue with at least one of: a hardware component, hardware module, hardware interconnect, environmental condition, firmware, firmware version, memory, disk space, network connectivity, network configuration, load balancing, performance characteristics, host side, and storage device configuration; and the one or more action plans include an action plan to update or correct at least one of: a hardware component, hardware module, hardware interconnect, environmental condition, firmware, firmware version, memory, disk space, network connectivity, network configuration, load balancing, performance characteristics, host side, and storage device configuration.

18. The IHS of claim 10 wherein the computing module is further configured to automatically further associate a high-plus, high-minus, medium-plus, medium-minus, low-plus, or low-minus risk score indicator with the storage area network based upon the results of the performance analysis.

19. A non-transitory computer readable medium having stored thereon a sequence of instructions which, when loaded and executed by a processor coupled to an apparatus, causes the apparatus to:

obtain diagnostic data for a storage area network by asking one or more users one or more questions and storing user responses to the one or more questions;

obtain test data by running one or more testing modules on at least one component of the storage area network;

execute a performance analysis of the storage area network, including the obtained diagnostic data and the obtained test data;

identify one or more performance issues and one or more action plans for resolution based upon results of the performance analysis;

provide a report to the one or more users, the report including the one or more identified performance issues and the one or more action plans; and automatically associate a high, medium, or low risk score indicator with the storage area network based upon the results of the performance analysis.

20. The non-transitory computer readable medium of claim 19, wherein the processor coupled to the apparatus further causes the apparatus to:

automatically further associate a high-plus, high-minus, medium-plus, medium-minus, low-plus, or low-minus risk score indicator with the storage area network based upon the results of the performance analysis.

* * * * *